United States Patent [19]

Patil et al.

[11] 4,248,765

[45] Feb. 3, 1981

[54] SURFACE POLYMERIZATION ON PIGMENTS FOR IMPROVED DISPERSIBILITY

[75] Inventors: Arvind S. Patil, Grosse Ile, Mich.; Lowell E. Netherton, Summit, N.J.

[73] Assignee: BASF Wyandotte Corporation, Wyandotte, Mich.

[21] Appl. No.: 969,490

[22] Filed: Dec. 14, 1978

[51] Int. Cl.$^3$ .............................................. C08J 3/20
[52] U.S. Cl. ............................... 260/42.53; 260/37 N; 260/38; 260/40 R
[58] Field of Search ................ 260/42.53, 37 N, 40 R, 260/38

[56] References Cited

U.S. PATENT DOCUMENTS

| 3,117,943 | 1/1964 | Corbiere et al. | 260/42.53 |
|---|---|---|---|
| 3,133,893 | 5/1964 | Newman | 260/42.53 |
| 3,198,772 | 8/1965 | Chadha | 260/42.53 |
| 3,393,165 | 7/1968 | Evans et al. | 260/42.53 |
| 3,444,142 | 5/1969 | Kolyer et al. | 260/37 N |
| 3,533,984 | 10/1970 | Yamamoto et al. | 260/37 N |
| 3,661,620 | 5/1972 | Dekking et al. | 260/42.53 |
| 3,775,364 | 11/1973 | Duggins | 260/42.53 |
| 3,899,473 | 8/1975 | Johansson | 260/42.53 |
| 4,130,512 | 12/1978 | Streat | 260/42.53 |
| 4,141,857 | 2/1979 | Levy et al. | 195/63 |

*Primary Examiner*—Lewis T. Jacobs
*Attorney, Agent, or Firm*—Joseph D. Michaels; Arnold S. Weintraub

[57] ABSTRACT

A monomeric reactant is adsorbed on the surface of a pigment prior to its agglomeration. The subsequent addition of a polymerization initiator or second reactant produces a coated pigment of improved dispersibility, especially in chemically related polymer binder systems.

10 Claims, No Drawings

SURFACE POLYMERIZATION ON PIGMENTS FOR IMPROVED DISPERSIBILITY

BACKGROUND OF THE INVENTION

1. Field of the Invention

The present invention pertains to pigments. More particularly, the present invention concerns methods for improving the dispersibility of pigments. Even more particularly, the present invention concerns methods for coating pigments to improve the dispersibility thereof.

2. Prior Art

Conventionally, water-based pigments are produced by precipitating water-soluble salts followed by the filtration, washing and, then, drying of the salts. During water removal the pigment particles typically undergo aggregation or agglomeration. Because of its higher surface tension, compared to the pigment, water brings the pigment particles to the closest possible distance with a maximum of force. This aggregated pigment is subsequently hard to disperse since any organic binder or solvent is unable to wet and separate the primary particles of agglomerates due to van der Waals attractive forces. Where the ultimate properties of a pigment are dependent on its final state of subdivision, considerable mechanical energy is required in order to achieve the desired state of fineness. Where pigment particles are needle shaped, as in transparent oxide, the particle-to-particle contact occurs on the longer axis, making separation even more energy intensive. For transparent pigments, where the ultimate division has to be smaller than the wavelengths of visible light, great effort is required to disperse the pigment.

In order to improve the dispersibility of highly agglomerated pigment, many types of wetting, dispersing, flowing agents or surfactants are used. They are added to the binder-solvent system while the pigment is being treated or oftentimes while the pigment is manufactured. In manufacturing coatings and inks a multitude of binders and solvents are used. Generally, polymeric binders such as acrylic polymer, alkyd polyester, nitrocellulose, polyamide, polyvinyl, polystyrene and the like are used. In order to produce a durable coating the binder polymer has to interact with the surface of the pigment. Aside from the physical accessibility of the pigment surface certain considerations of compatibility of chemical groups are important. Thus, the present art relies on a multitude of surfactants or wetting agents to establish a pigment surface that is compatible with a given binder. Hence, no universal treatment is available wherein the pigment surface is compatible in all types of binder polymers.

STATEMENT OF RELEVANT ART

To the best of applicant's knowledge the most closely related art is that found in:
U.S. Pat. No. 2,558,302.

SUMMARY OF THE INVENTION

In accordance with the present invention pigment of improved dispersibility in a binder system is achieved by coating the pigment by surface polymerization of the coating thereon. The coating is provided by adsorbing a monomer onto the surface of the pigment followed by the polymerization thereof.

Surface polymerization is achieved by either the addition of a second reactant or a polymerization catalyst to the monomer coated pigment. Ideally the polymer chosen for surface reaction on the pigment should be the same as that used in the binder system. Chemically akin polymers can, also, be used for the surface polymerization without compromising chemical compatibility and hence maximum dispersibility and stability in coatings. Thus, co-monomers can advantageously be employed.

In conducting the surface polymerization elevated temperatures are employed. Generally, the polymerization is conducted prior to drying the pigment and, preferably, soon after the pigment is precipitated.

The present invention is particularly efficacious in improving the dispersibility of transparent iron oxide and other needle shaped pigments.

For a more complete understanding of the present invention reference is made to the following detailed description and accompanying examples.

DESCRIPTION OF THE PREFERRED EMBODIMENTS

In accordance with the present invention the dispersibility of a pigment is improved by coating the pigment prior to its agglomeration. The pigment coating is achieved by a surface polymerization reaction comprising adsorbing the monomer onto the surface of the pigment and thereafter polymerizing the monomer by either the addition of a catalyst or a co-reactant to the pigment containing monomer.

By initially adsorbing the monomer onto the pigment particle surfaces, fuller surface coverage is assured. Ordinarily, as the molecular weight of the polymer increases, the polymer with the lengthened chain is unable to diffuse into pigment agglomerates and hence achieve satisfactory surface coverage. The present invention alleviates this by first adsorbing the monomer onto the particle surface and, then, polymerizing in situ. Furthermore, since monomers are the smallest and simplest coating unit they are able to diffuse through the narrow pigment particle capillaries and adsorb onto the surface of the pigment particles.

The present invention is particularly advantageous, as above-noted, in that it enables the production of pigments which are tailor-made for particular binder systems utilized in coatings and inks. Hence, the present invention provides coated pigments, which are chemically compatible with the binder.

The present invention, it should be noted, is applicable to all pigments, whether organic or inorganic regardless of whether it is produced in either aqueous or non-aqueous medium. However, it has been found that the present invention is particularly advantageous in coating transparent iron oxide pigments.

The surface polymerization hereof is undertaken prior to drying the pigment to minimize agglomeration. Optimally, the surface polymerization is conducted in the pigment soon after it is prepared. Surface polymerization is carried out at elevated temperatures, generally, ranging from about 25° C. to about 100° C. and, preferably, from about 75° C. to about 95° C.

As indicated hereinabove, surface polymerization is achieved by either (a) catalytic polymerization of the monomer or (b) the addition of a co-reactant to the monomer.

In conducting catalytic polymerization the monomer is adsorbed onto the pigment and, then, the catalyst or initiator is added thereto. The polymerization is conducted in a slurry of pigment. Herein, the degree of polymerization is dictated by the quantity of adsorbed monomer, and initiator as well as the temperature of the slurry.

Useful monomers include, for example, vinyl chloride, acrylonitrile, styrene, methyl methacrylate, acrylic acid and the like.

Useful initiators include peroxides, such as hydrogen peroxide, persulfates, such as alkali persulfate, including sodium persulfate, potassium persulfate and the like, and so forth.

Representative co-reactant surface polymerization systems include glycerol-phthalic anhydride; dicarboxylic acid-amine systems, such as adipic acid-hexamethylene, diamine, adipic acid-hexanediamine, urea-formaldehyde, and the like.

It is, also, possible to form an amide on the surface of the pigment by employing a monocarboxylic acid, such as stearic acid or oleic acid, with an amine.

In practicing the present invention amounts in excess of stoichiometric requirements are employed to ensure polymerization.

Ordinarily, the slurry is heated to an elevated temperature, as described hereinabove, and, then, the monomer is added thereto. After the monomer is adsorbed onto the pigment surface, usually in about 0.25 to about 1.0 hours, the catalyst or co-reactant is added thereto. Polymerization is conducted at the hereinabove noted elevated temperature for about 0.5 to about 3.0 hours. Thereafter, the pigment is recovered by conventional techniques.

For a more complete understanding of the present invention reference is made to the following examples. The examples are to be construed as illustrative and not limitative of the present invention. In the examples all parts are by weight absent indications to the contrary.

In the following examples a transparent iron oxide pigment was employed in the form of an aqueous slurry thereof. Furthermore, in all the examples, the pigment was freshly precipitated prior to surface polymerization.

EXAMPLE I

Into a suitable reaction vessel equipped with heating means and agitation means was added a three liter aqueous slurry of freshly prepared transparent iron oxide pigment. The slurry contained approximately ten parts per liter of solids. The slurry was heated to 90° C. and, then, 4.0 parts of glycerol was added to the slurry. The slurry was stirred for fifteen minutes to ensure adsorption of the glycerol onto the pigment particles. Six parts of phthalic anhydride was then added to the slurry which was then agitated for about one hour while maintaining the 90° C. temperature in the vessel. The treated pigment was then allowed to cool to room temperature; was filtered; was washed with water to remove excess salt, and, then, dried at 80° C. to about 100° C. Thereafter the pigment was milled to a powder having particles of about 20 microns.

EXAMPLE II

The procedure of Example I was repeated, but in lieu of the glycerol 4.0 mls of acrylic acid was added to the slurry initially. After stirring 2.0 mls of 30% hydrogen peroxide was added to the slurry to initiate the acrylic acid polymerization. After the polymerization was completed the pigment was filtered, washed, dried and ground as described in Example I.

EXAMPLE III

The procedure of Example II was repeated employing 4.0 mls of methyl acrylate in lieu of the acrylic acid and 1.0 parts of potassium persulfate in lieu of hydrogen peroxide, as the initiator.

EXAMPLE IV

Into a suitable reaction vessel equipped with heating means and agitation means was added a three liter aqueous slurry of transparent iron oxide pigment containing approximately 15 gpl. The slurry was heated to about 95° C. and 2.5 parts of adipic acid was added thereto. After stirring for about 15 minutes 2.0 parts of hexanediamine was added to the slurry. The slurry temperature was adjusted to 75° C. and was maintained thereat for about 1 hour and under agitation.

EXAMPLE V

The procedure of Example I was repeated utilizing five parts of stearic acid in lieu of the glycerol and two parts of hexanediamine in lieu of the phthalic anhydride.

EXAMPLE VI

The procedure of Example I was repeated employing five parts of stearic acid in lieu of the glycerol and 2 mls of 41% monomethyl amine solution.

EXAMPLE VII

Into a suitable reaction vessel equipped with heating means and stirring means was added about 750 liters of a 15 gpl aqueous slurry of transparent iron oxide pigment. The slurry was heated to 90° C. and 1452 parts of glycerol was added thereto. The slurry was then agitated for about 0.5 hours. Next, 2180 parts of phthalic anhydride was added to the slurry. The slurry was agitated for about 1.0 hours while maintaining the temperature at 90° C. to ensure complete polymerization. Thereafter, the slurry was cooled and the pigment was filtered in a filter press, washed, dried at 70° C., and milled in the manner described in Example I.

EXAMPLE VIII

A 5% pigment-binder-solvent mixture was ground with 100 parts of glass beads on a Red Devil paint shaker. Thereafter drawdowns on aluminum foil were drawn with a 60 micron film applicator.

The drawdowns were prepared from the pigments of Examples I–VI a control for each pigment was simultaneously drawn down and compared to the treated pigments hereof. The pigments of Examples I and VI were tested in a polyester binder system. The pigments of Examples II and VII were tested against their controls in a thermoset acrylic. The pigments of Examples IV and V were tested against their controls in a polyamide system. Thereafter, each drawdown and its control were tested in a thermoset acrylic system. In each instance the surface treated pigment was superior to its control with respect to dispersibility.

Specifically, it has been observed that transparent iron oxide pigments coated with a glycerol-phthalic anhydride polymer exhibit excellent dispersibility in a polyester binder system. In such a system the so-coated pigments reflect light specularly rather diffusely.

Likewise coated transparent iron pigments form superior inks in polyamide ink systems when coated with an adipic acid-hexanediamine polymer.

Having, thus, described the invention what is claimed is:

1. A method for coating a pigment, comprising adsorbing a monomer on the surface of the pigment and thereafter polymerizing the monomer on the pigment surface by the addition thereto of a coreactant, wherein said monomer-coreactant system is selected from the group consisting of (a) urea-formaldehyde, (b) glycerol-phthalic anhydride, and (c) dicarboxylic acid-amine.

2. The method of claim 1, wherein said pigment is a water-based pigment.

3. The method of claim 2, wherein said monomer is adsorbed on the surface of said pigment for from about 0.25 to about 1.0 hours and thereafter the monomer is polymerized at a temperature of from about 25 to about 100 degrees centigrade for from about 0.5 to about 3.0 hours.

4. The method of claim 3, wherein said pigment is a transparent iron oxide pigment.

5. The method of claim 4, wherein said monomer is polymerized at a temperature of from about 75 to about 95 degrees centigrade.

6. The method of claim 5, wherein said monomer-coreactant system is glycerol-phthalic anhydride.

7. The method of claim 5, wherein said monomer-coreactant system is selected from the group consisting of adipic acid-hexanediamine and adipic acid-hexamethylene diamine.

8. The method of claim 5, wherein said monomer-coreactant system is stearic acid-hexanediamine.

9. The method of claim 5, wherein said monomer-coreactant system is glycerol-monomethylamine.

10. A method of coating a pigment, comprising adsorbing an amine on the surface of the pigment and thereafter polymerizing the amine on the pigment surface by the addition of a monocarboxylic acid to the amine.

* * * * *